US008550199B2

(12) United States Patent
Moeller et al.

(10) Patent No.: US 8,550,199 B2
(45) Date of Patent: Oct. 8, 2013

(54) BICYCLE TRANSMISSION SYSTEM

(75) Inventors: Frank Moeller, Milford (GB); Martin Weber, Berlin (DE)

(73) Assignee: Nexxtdrive Limited, London (GB)

( * ) Notice: Subject to any disclaimer, the term of this patent is extended or adjusted under 35 U.S.C. 154(b) by 11 days.

(21) Appl. No.: 13/148,635

(22) PCT Filed: Feb. 12, 2010

(86) PCT No.: PCT/GB2010/000249
§ 371 (c)(1),
(2), (4) Date: Oct. 5, 2011

(87) PCT Pub. No.: WO2010/092345
PCT Pub. Date: Aug. 19, 2010

(65) Prior Publication Data
US 2012/0012412 A1    Jan. 19, 2012

(30) Foreign Application Priority Data

Feb. 12, 2009 (GB) .................................. 0902356.5
Apr. 24, 2009 (EP) .................................... 09251183
May 5, 2009 (EP) .................................... 09159467

(51) Int. Cl.
*B62M 6/50* (2010.01)
(52) U.S. Cl.
USPC ..................................... 180/206.3; 180/206.7
(58) Field of Classification Search
USPC ................. 180/206.1, 206.2, 206.3, 206.7
See application file for complete search history.

(56) References Cited

U.S. PATENT DOCUMENTS

| 5,167,591 | A | 12/1992 | Cowan |
| 6,248,036 | B1 | 6/2001 | Masaki |
| 7,156,780 | B1 * | 1/2007 | Fuchs et al. ................ 482/92 |

FOREIGN PATENT DOCUMENTS

| DE | 19949225 A1 | 4/2001 |
| DE | 10243751 A1 | 6/2003 |
| DE | 102007050552 B3 | 9/2008 |
| EP | 0937600 A2 | 8/1999 |
| EP | 09251183.1 A1 | 8/2010 |
| JP | 04321482 A | 11/1992 |
| JP | 10203466 A | 8/1998 |
| JP | 2002331984 A | 11/2002 |
| JP | 2008285069 A | 5/2007 |

(Continued)

OTHER PUBLICATIONS

PCT International Search Report and Written Opinion for PCT/GB2010/000249 dated May 18, 2010.
GB Search Report for Application No. GB0902356.5 dated May 6, 2009.
EPO Extended Search Report for Application No. 09159467.1 dated Apr. 16, 2010.

(Continued)

*Primary Examiner* — Kevin Hurley
(74) *Attorney, Agent, or Firm* — Harry K. Ahn; McCarter & English, LLP

(57) ABSTRACT

A method is provided for controlling operation of a pedal cycle (10) having a rear hub-mounted electro-mechanical transmission arrangement in which a chain-driven rear sprocket (80), an input electrical machine (120) and the hub (100) are each coupled to a respective branch of a three-branch epicyclic gear set (140). Allowing for natural variations in input torque by a cyclist over a cycle of the crank arms (50), a substantially constant current is caused to exist in the input electrical machine (120) such that a change in torque applied by the cyclist results in a change in transmission ratio between the rear sprocket (80) and the hub (100), thereby providing a form of automatic and continuously variable transmission for the pedal cycle (10).

20 Claims, 11 Drawing Sheets

(56) References Cited

FOREIGN PATENT DOCUMENTS

| WO | 00/43259 A1 | 7/2000 |
| WO | 00/59773 A2 | 10/2000 |
| WO | 2006035215 A1 | 4/2006 |

OTHER PUBLICATIONS

EPO Extended Search Report for Application No. 09251183.1 dated Mar. 29, 2010.

* cited by examiner

BICYCLE TRANSMISSION SYSTEM

CROSS REFERENCE TO RELATED APPLICATIONS

This application is a national phase of PCT application No. PCT/GB2010/000249, filed 12 Feb. 2010, which claims priority to GB patent application No. 0902356.5, filed 12 Feb. 2009; EP patent application No. 09251183.1, filed 24 Apr. 2009; and EP patent application No. 09159467.1, filed 5 May 2009, all of which are incorporated herein by reference.

FIELD

This invention relates to a method of operating a pedal cycle having an electro-mechanical drive arrangement.

BACKGROUND

There are various forms of pedal cycle. One, conventional, form of pedal cycle is that which is only ever driven by a cyclist applying force to the pedals thereof, such cycles sometimes being referred to as "push bikes". Another, more recent, form of pedal cycle is the electrically-assisted pedal cycle (EAPC) in which electrical power is used to assist the efforts of a cyclist pedalling the cycle. Both conventional pedal cycles and EAPCs may have two, three or four wheels, and, in some, cases even more. In the present document, the term "pedal cycle" is used to include both conventional pedal cycles and EAPCs.

As mentioned, in an EAPC, electrical power is used to assist the efforts of a cyclist pedalling the cycle. Accordingly, EAPCs include means for storing electrical energy, such a batteries, and an electric motor arranged to propel, or at least assist in propelling, the cycle. The batteries can usually be recharged by plugging them into a supply of electrical energy, such as an outlet from a mains supply, and also by recovering energy from motion of the cycle by way of regenerative braking. The principle of regenerative braking will be familiar to those skilled in this field of technology. As a result, the overall effort required by a cyclist to pedal an EAPC is lower than for a conventional cycle.

EAPCs can usually be placed into one of two groups. The first group is that in which the cycle can provide electrical assistance on demand, at any time, regardless of whether or not the cyclist is pedalling. Cycles in this group are sometimes referred to as "e-bikes", and can be thought of as being generally equivalent to electric mopeds, although one that is generally easier to pedal. Cycles in the second group only provide electrical assistance when the cyclist is pedalling. These are sometimes referred to as "pedelecs".

In most European countries, pedelecs at least are effectively classified as conventional bicycles and so may be ridden without a driving license or insurance. In at least the UK, e-bikes are also classified in this way. There are therefore few barriers to owning and operating an EAPC.

In recent years, technical advances have been made to the electro-mechanical drive arrangements and to the associated energy storage and recovery devices used in EAPCs. These advances have resulted in EAPCs that can be operated with greater efficiency, and hence greater ease, by the cyclist.

For all the reasons given above EAPCs are becoming increasing popular, particularly in some European countries.

A suitable electro-mechanical drive arrangement for driving an EAPC is described in WO-A1-2006/035215, the contents of which are herein incorporated in their entirety. For example, this earlier document describes, with reference to FIG. 2 thereof, an arrangement that can be mounted to replace the conventional hub of a rear wheel of a bicycle. The replacement hub contains first and second motor-generators and first and second epicyclic gear sets. The arrangement is such that the motor-generators and the epicyclic gear sets operate to provide a compact drive arrangement combining (a) a variable transmission ratio between the input from the cyclist and the output to the driving wheel, with (b) electrical assistance.

Although various drive arrangements exist for EAPCs, including that described in WO-A1-2006/035215, the unpredictable nature of how a cyclist will cycle makes control and operation of such arrangements problematic. In this respect, a cyclist is very different from an engine.

An object of at least certain embodiments of this invention is to provide a method of operating an electro-mechanical drive arrangement for a pedal cycle similar to that described in WO-A1-2006/035215.

SUMMARY

According to one aspect of this invention, there is provided a method of operating a pedal cycle, the pedal cycle having an electro-mechanical drive arrangement including an input electrical machine, an output electrical machine and an input epicyclic gear set; wherein, of the input epicyclic gear set, a first component is coupled to be driven by crank arms of the cycle, a second component is coupled to one of the rotor and stator of the input electrical machine, the other of the rotor and stator being fixed relative to the cycle, and the third component is coupled to drive a wheel of the cycle; the output electrical machine being arranged to at least assist in driving the or another wheel of the cycle when operated as a motor; the method including the steps of:

a) operating the input electrical machine as a generator to at least partly power the output electrical machine as a motor;
b) determining the angular position of the crank arms;
c) controlling the current in the input electrical machine so as not to exceed a maximum current nor fall below a minimum current for the determined angular position of the crank arms.

By controlling the current in the input electrical machine in this way, the torque on that machine, which is proportional to current, is also controlled. As the input electrical machine is coupled to the crank arms by the second epicyclic gear set, controlling the torque in the input electrical machine also controls the torque in the crank arms (the two are proportional), which is the torque that the cyclist applies. Thus, controlling the current in the input electrical machine determines the torque which the cyclist applies.

Controlling the current in this way results in the arrangement automatically "changing gear". For example, should the cyclist press on the pedals with more force such that he or she applies torque that exceeds the torque corresponding to the maximum current of the input electrical machine for the determined crank position, the electrical machine "gives way" and so accelerates. This changes the transmission ratio of the input epicyclic gear set to, in effect, change into a lower gear. Thus, when the torque that the cyclist applies exceeds a certain limit, the arrangement automatically changes down into a lower gear. Thus, the arrangement automatically changes down in conditions when this is needed, such as when climbing a hill or accelerating rapidly.

Similarly, should the cyclist press the pedals with less force and hence apply less torque than the torque that corresponds to the minimum current of the input electrical machine, the electrical machine decelerates and resists motion of the crank arms by the cyclist. This deceleration of the input electrical machine again changes the transmission ratio of the second epicyclic gear set to, in effect, change into a higher gear. Thus, when the torque that the cyclist applies falls below a certain limit, the arrangement automatically changes up into a higher gear. Thus, the arrangement automatically changes up in conditions when this is needed, such as when going down hill or when easing off and approaching a steady speed from a period of acceleration.

In this way, embodiments of the invention may be used in conventional pedal cycles and in EAPCs to provide an arrangement for automatically changing gear.

It will be appreciated by the skilled person that current control of an electrical machine may be readily accomplished with existing electrical components. Thus, embodiments of the method can be used to provide automatic transmission-ratio control in a conventional pedal cycle and/or in an EAPC in a straightforward and inexpensive manner. It should also be noted that the use of an epicyclic gear set in this way provides continuously-variable transmission, rather than the stepped gearing usual with cycles that often changes gear unsatisfactorily under heavy loads.

The method may include operating control means to operate the input electrical machine as a generator and/or to operate the output electrical machine as a motor and/or to control the current in the input electrical machine. The control means may include one or more motor controllers and/or one or more generator controllers.

The arrangement may include an output epicyclic gear set, a first component thereof being fixed relative to the cycle, a second component thereof being coupled to the rotor of the output electrical machine, the stator being fixed relative to the cycle, and the third component thereof being coupled to drive the, or the other, wheel of the cycle.

The third component of the input epicyclic gear set may be coupled, and the output electrical machine may be arranged, to drive and be driven by one and the same wheel of the pedal cycle. The two may be, respectively, coupled and arranged to drive and be driven by different wheels of the cycle In an embodiment, the first component of the input epicyclic gear set may be the planetary carrier, the second component thereof may be the sun gear, and the third component thereof may be the annulus. Similarly, in an embodiment, the first component of the output epicyclic gear set may be the planetary carrier, the second component thereof may be the sun gear and the third component thereof may be the annulus.

The maximum current and the minimum current may be different values; they may be the same value. Where they are different values, this creates a band within which the torque applied by the cyclist may vary without the arrangement "changing gear", i.e. varying the transmission ratio. In this way, the arrangement mimics, at least to some degree, the behaviour of a conventional geared cycle and so may find favour with some cyclists more used to such conventional cycles. Where the maximum current and minimum current are the same, this results in the arrangement varying the transmission ratio whenever the torque applied by the cyclist differs from that corresponding to the current drawn from the input electrical machine. This arrangement can be used to cause the cyclist to cycle with a torque that is close to, or coincides with, optimum cycling efficiency.

There may be a plurality of maximum and/or minimum currents for the determined angular position of the crank arms. Step (c) may include the step of determining a maximum and/or minimum current from the plurality thereof and then controlling the current in the input electrical machine so as not to exceed this determined maximum current and/or not fall below this determined minimum current for the determined angular position of the crank arms. The determining may include receiving an input indicative of a selected maximum and/or minimum current and using this to set the determined maximum current and/or minimum current. The determining may include or may further include determining the cadence of the crank arms and using this to set the determined maximum current and or minimum current. For example the method may include consulting a record indicative of how torque output of a cyclist varies with cadence, and from this obtaining an indication of a torque that corresponds to the determined cadence, and hence of an appropriate maximum and/or minimum current.

The input may be received from input means operable by the cyclist.

There may be a plurality of selectable pairs of maximum and minimum currents for the determined angular position of the crank arms. Where the maximum in one selectable pair is larger than the maximum in another selectable pair, the minimum in the one pair may also be larger than the minimum in the other pair. Thus, a plurality of different bands is created. Where the maximum and minimum currents are the same, there may be a plurality of singly selectable, different, currents.

Selecting the maximum and/or minimum currents in this way allows the cyclist to select the level of torque at which the arrangement varies the transmission ratio to coincide with his or her personal preference. Furthermore, by selecting different maxima and/or minima whilst cycling, without necessarily varying the torque he or she applies to the crank arms, the cyclist can force the arrangement to vary the transmission ratio.

The maximum and minimum currents may be different at different angular positions of the crank arms. This is to take account of the natural variation in torque applied by the cyclist to the crank arms over one cycle. The maximum and minimum currents may vary sinusoidally with angular position of the crank arms. The method may include the step of varying the maximum and minimum currents with angular position of the crank arms.

The method may include supplying all electrical energy generated by the input electrical machine to the output electrical machine for operating the output electrical machine as a motor.

In this way, a conventional pedal cycle fitted with the electro-mechanical arrangement may be provided with an arrangement for automatically changing gear.

The method may include supplying stored electrical energy to the output electrical machine from a store of electrical energy for operating the output electrical machine as a motor. The method may include supplying stored electrical energy in this way to supplement electrical energy generated from the input electrical machine and supplied to the output electrical machine. The method may include receiving an assist input indicating that stored electrical energy should be supplied to the output electrical machine to supplement electrical energy supplied thereto and generated by the input electrical machine; and may include supplying stored electrical energy accordingly in response to receipt of the assist input. The method may include operating the control means to supply stored electrical energy in this way. In this way, stored electrical energy can be used to assist the cyclist in propelling the cycle.

The assist input may be received from assist input means operable by the cyclist.

The assist input may be indicative of one of a plurality of selectable levels of assistance that is to be provided to the cyclist. The assist input may be indicative of a factor by which the power input by the cyclist should be augmented by power supplied to the output electrical machine by discharging the store of electrical energy. The method may include discharging the store of electrical energy and operating the output electrical machine at least partly thereby, in response to receipt of the assist input.

The method may only supply stored electrical energy to the output electrical machine to supplement generated electrical energy, and may supply substantially no electrical energy to the output electrical machine, such that the output electrical machine is not operated as a motor, when no electrical energy is generated by the input electrical machine. In this way, the cycle operates as a pedelec.

The method may supply stored electrical energy to the output electrical machine regardless of whether or not electrical energy is being generated by the input electrical machine. The method may do this in response to receiving the assist input or in response to receiving another input. In this way, the cycle can be operated as an e-bike. The other input may be a throttle input, variably indicative of the electrical power that should be supplied to the electrical machine.

The method may include the step of controllably supplying electrical power to the output electrical machine such that that power varies over a cycle of the crank arms. The variation may be such that it at least reduces the variation in power output to the or each driven wheel over a cycle of the crank arms, such variation resulting from a variation in power input by the cyclist over that cycle. In this way, the power to the output electrical machine is varied over a cycle of the crank arms to at least partly make up for the naturally sinusoidally varying input to the arrangement by the cyclist and such that the cycle performs more smoothly over a cycle of the crank arms. In doing this the output electrical machine may be powered by discharging the store of electrical energy over successive cycles of the crank arms; and/or by storing temporarily electrical energy generated in one part of the cycle of the crank arms, and using this to power the output electrical machine in another part of the cycle. The one part of the cycle may be a part in which power input by the cyclist is relatively high, and the other part of the cycle may be a part in which power input by the cyclist is relatively low. The output electrical machine may be powered in this way such that there is substantially no depletion of the store of electrical energy over a complete cycle. In this way, the method may "iron out" fluctuations in power input. The control means may arranged accordingly.

The method may include the step of determining that the crank arms are substantially stationary and, in response thereto, substantially short-circuiting the input electrical machine in response thereto. By short-circuiting the input electrical machine when the crank arms are at rest, the input electrical machine can be substantially locked such that power input by the cyclist is transmitted mechanically through the input epicyclic gear set to the driven wheel, thereby allowing the cyclist to pull smartly away from rest. The method may include maintaining the substantial short-circuiting of the input electrical until the actual current in the input electrical reaches the maximum current. The short circuit may be maintained for less than half a cycle; it may be maintained for less than quarter of a cycle; it may be maintained for between about 10 to 20 degrees of rotation of the crank arms; it may be maintained for about 15 degrees of rotation.

The method may include operating the input electrical machine and/or the output electrical machine as a generator to retard the pedal cycle. Electrical power generated in this way may be used to recharge the store of electrical energy. The method may include operating one or both of the electrical machines inefficiently, for example, by shifting the phase of the current and/or voltage thereof to dissipate generated electrical energy as heat and thereby retard the pedal cycle. The method may include operating the input electrical machine and/or the output electrical machine as a generator in this way in response to a signal from a brake input device operable by the cyclist. The brake input device may be a brake lever. The method may include operating the input and/or output electrical machine in this way in response to sensing backwards movement of the crank arms; and optionally, backwards movement of the crank arms when the crank arms are between 60 degrees and 120 degrees to the vertical when the pedal cycle is on level ground.

The pedal cycle may be, for example, a conventional pedal cycle in which drive is only ever provided by a cyclist applying force to the pedals thereof, such cycles sometimes being referred to as "push bikes". The pedal cycle may be, for example, an EAPC, such as, for example, a pedelec or an e-bike. The pedal cycle may have one, two, three, four or more wheels. The pedal cycle may be a bicycle (including solo and tandem bicycles), a tricycle, or conceivably any form of cycle which can be at least partly propelled by a cyclist pedalling.

According to a second aspect of this invention, there is provided a method of operating a pedal cycle, the pedal cycle having an electro-mechanical drive arrangement including an input electrical machine, an output electrical machine and an input epicyclic gear set; wherein, of the input epicyclic gear set, a first component is coupled to be driven by crank arms of the cycle, a second component is coupled to one of the rotor and stator of the input electrical machine, the other of the rotor and stator being fixed relative to the cycle, and the third component is coupled to drive a wheel of the cycle; the output electrical machine being arranged to be driven by the or by another wheel of the cycle and to be operated as a generator; the method including the steps of:

a) operating the output electrical machine as a generator to at least partly power the input electrical machine as a motor to at least assist in driving the wheel coupled to the third component b) determining the angular position of the crank arms;

c) controlling the current in the input electrical machine so as not to exceed a maximum current nor fall below a minimum current for the determined angular position of the crank arms.

In at least certain embodiments of this second aspect, the electro-mechanical arrangement can be the same as that of at least certain embodiments of the first aspect, but the input electrical machine is operated in these embodiments of the second aspect as a motor and powered by the output electrical machine being operated as a generator. In similarity with the first aspect, in at least certain embodiments of this second aspect, the current in the input electrical machine is controlled in the same way (albeit with that machine operating as a motor) such that the arrangement automatically changes gear in the same way. As will be understood from the description of certain exemplary embodiments hereinbelow, the electro-mechanical drive arrangement may automatically operate in accordance with the second aspect on one side of the "node point" described below, and may operated in accordance with the first aspect on the other side of the "node point". For example, by maintaining substantially the same current in the input electrical machine, as the cyclist accelerates the pedal cycle, operation may start in accordance with the first aspect, cross the node point, and then operate in accordance with the second aspect, without substantially changing that current.

Optional features of the first aspect may also be optional features of the second aspect.

According to a third aspect of the invention, there is provided a
pedal cycle arranged to carry out a method as defined hereinabove.

According to a third aspect of this invention, there is provided processing means programmed and operable to carry out a method as defined hereinabove.

According to a fourth aspect of this invention, there is provided a computer program having code portions executable by processing means to cause those means to carry out a method as defined hereinabove.

According to a fifth aspect of this invention, there is provided a record carrier having thereon or therein a record of a computer-readable instructions executable to cause processing means to carry out a method as defined hereinabove.

The record carrier may include storage means. The storage means may include solid state storage means, such as non-volatile memory. The storage means may include one or more of ROM, EPROM, EEPROM and flash memory. The storage means may include an optical and/or magnetic disk. The record carrier may include an electrical, radio and/or electromagnetic signal.

BRIEF DESCRIPTION OF THE DRAWINGS

Specific embodiments of the invention will now be described by way of example only and with reference to the accompanying drawings, in which.

SPECIFIC DESCRIPTION OF CERTAIN EXEMPLARY EMBODIMENTS

Structural Arrangement

Figure 1:
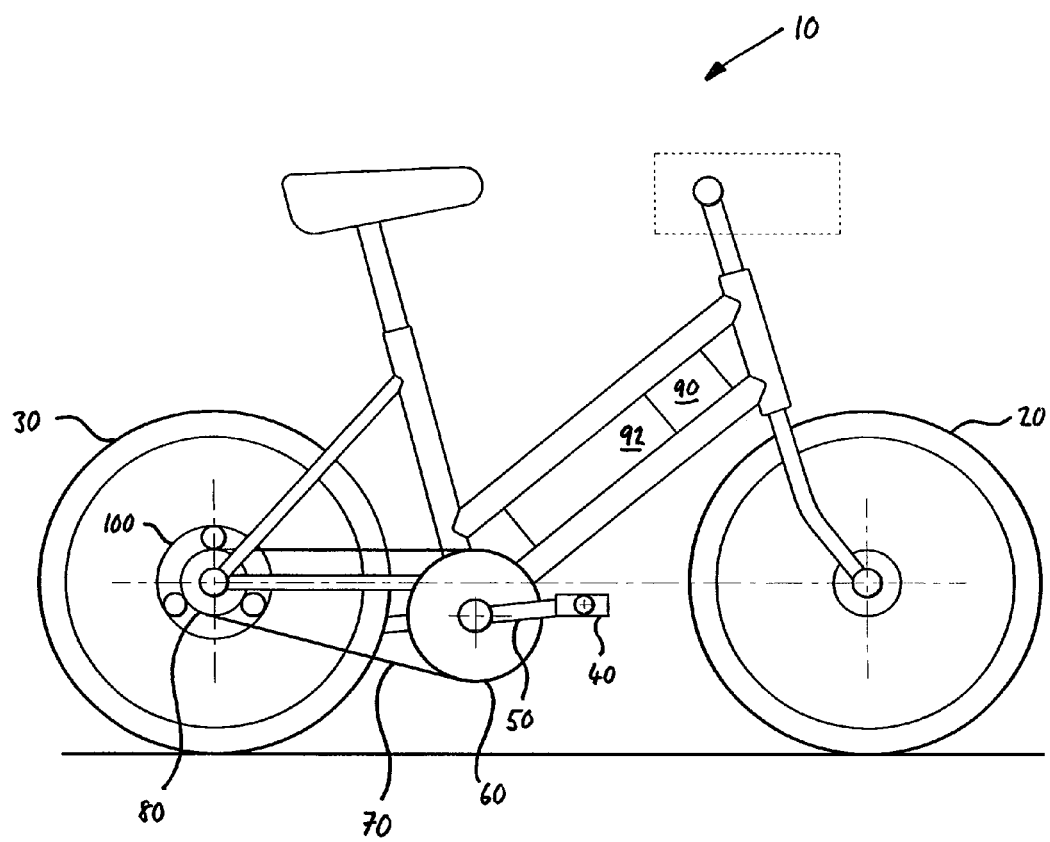
FIG. 1 shows a pedal cycle in which the invention is embodied.

FIG. 1 shows an electrically-assisted pedal cycle in the form of a bicycle 10. The bicycle 10 is similar to a conventional bicycle in having a steerable wheel 20 at the front and a driveable wheel 30 at the back. The bicycle 10 also has the conventional arrangement of pedals 40 on crank arms 50 that drive a front toothed cog 60 connected by a chain 70 to a rear sprocket 80, the rear sprocket being mounted co-axially with the rear wheel 30. However, the bicycle 10 differs from a conventional bicycle in that the rear sprocket 80 is not fixedly mounted to the hub 100 of the rear wheel 30 to drive that wheel directly. Instead, the rear sprocket 80 drives certain components of an electro-mechanical drive arrangement that are housed within the hub 100.

Figure 2:
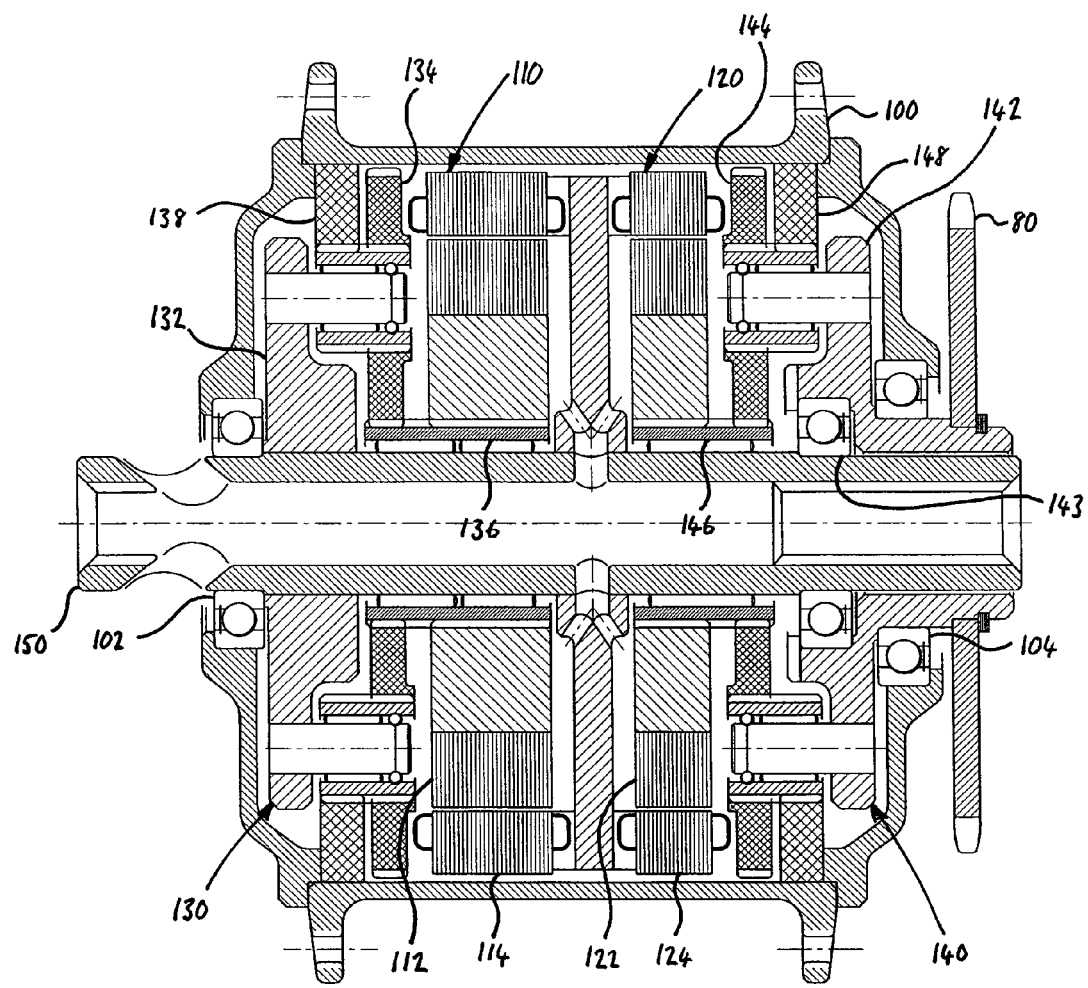
FIG. 2 shows a sectional view of a wheel hub of the pedal cycle in which certain components of an electro-mechanical drive arrangement are housed, the section being taken radially.

FIG. 2 shows the hub 100 and its contents in detail. These include a first electrical machine in the form of a first radial-flux motor-generator 110, a second electrical machine in the form of a second radial-flux motor-generator 120, a first epicyclic gear set 130 and a second epicyclic gear set 140. For ease of reference, the second motor-generator 120 and the second epicyclic gear set 140 will be referred to as the "input motor-generator" 120 and "input epicyclic gear set" 140 (because they are more directly coupled to the rear sprocket 80); and the first motor-generator 110 and first epicyclic gear set 130 will therefore be referred to as the "output motor-generator" 110 and the "output epicyclic gear set" 130.

The arrangement of the input epicyclic gear set and input motor-generator will firstly be described. The input sprocket 80 is fixedly mounted to a collar that forms the planetary carrier 142 of the input epicyclic gear set 140. That planetary carrier 142 is mounted on bearings 143 for rotation about a rear wheel axle 150 that is fixed to the frame of the bicycle 10. The planet gears 144 are rotatably mounted on the planetary carrier 142 and mesh with a sun gear 146. The sun gear 146 is fixedly coupled to the rotor 122 of the input motor-generator 120 for rotation therewith, and is rotatably mounted about the axle 150. The stator 124 of the input motor-generator is fixedly mounted to the axle 150. The annulus 148, which also meshes with the planet gears 144, is fixed to an internal wall of the hub 100. As can be seen from FIG. 2, the planet gears 144 are stepped gears, with the part thereof that meshes with the annulus 148 being of lesser diameter than the part thereof that meshes with the sun gear 146.

The arrangement of the output epicyclic gear set 130 and the output motor-generator 110 will now be described. The planetary carrier 132 of the output epicyclic gear set 130 is fixedly mounted on the axle 150. The planet gears 134 are rotatably mounted on the planetary carrier 132 and mesh with the sun gear 136. The sun gear 136 is fixedly coupled to the rotor 112 of the output motor generator 110 for rotation therewith, and is rotatably mounted about the axle 150. The stator 114 of the output motor-generator 110 is fixedly mounted to the axle 150. The annulus 138, which also meshes with the planet gears 134, is fixed to the internal wall of the hub 100. The planet gears 134 of the output epicyclic gear set 130 are also stepped gears, with the part thereof that meshes with the annulus 138 being of lesser diameter than the part thereof that meshes with the sun gear 136.

The hub 100 is rotatably mounted, at one end, on the axle 150 by a bearing 102 and, at the other end on the collar that is the planetary carrier 142 of the input epicyclic gear set 140 by a bearing 104. The hub 100, supports, in the conventional manner, spokes that in turn support a wheel rim such that the hub can transmit torque to the rim for driving the bicycle 10.

Thus, the arrangement is very similar to that described in WO2006/035215 with reference to FIG. 2 of that publication. Indeed, it is envisaged that each of the arrangements disclosed in that publication may provide, in alternative embodiments of the present invention, the electro-mechanical drive arrangement of the bicycle 10 described herein with reference to FIG. 1.

Although, in the present embodiment, both of the epicyclic gear sets 130, 140 have toothed gears that mesh, it is envisaged that non-meshing contact-only epicyclic gear sets may be substituted for these in other embodiments.

Figure 3:
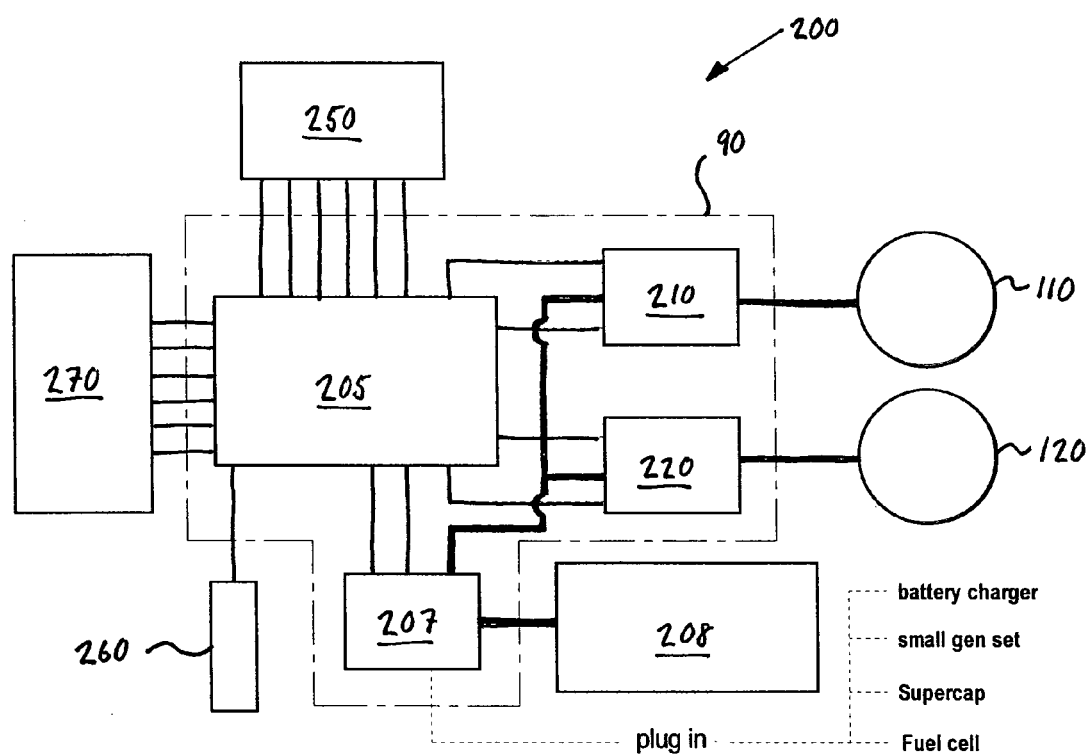
FIG. 3 is schematic representation of control means for controlling operation of the drive arrangement.

Returning to the present embodiment and with reference to FIG. 3, the bicycle 10 also includes control means 200 that is connected and arranged to control the input and output motor-generators 110, 120 in response to inputs received from input means. The control means 200 is in the form of an electronic control unit (ECU) 205, a battery management unit 207 and two motor-generator controllers: one of which will be termed the "input controller" 210 and is for controlling the input motor-generator 130, and the other one of which will be termed the "output controller" 220 and is for controlling the output motor-generator 110. The ECU 205 includes a microprocessor that is programmable and operable to carry out the steps of a method that embodies this invention. That method will be described hereinbelow with reference to FIG. 3 and FIG. 5. The ECU 205 is connected to the input controller 210, the output controller 220 and the battery management unit 207 for controlling operation of those three units.

The input means that provide inputs to the control means 200 includes user input means 250 and a crank speed and position sensor 260. The user input means 250 includes, in this embodiment, a user-operable power input device and a user-operable brake input device (none of which is shown). The power input device is arranged to be operated by a user to indicate generally the power, that is the rate of working, with which he or she wishes to pedal. The brake input device is arranged to be operated by the user to indicate a rate at which the bicycle 10 should be slowed.

In this embodiment, it is envisaged that the power input device is a user-operable selector that indexes between each of a plurality of different positions. Examples of such selector switches are twistable grip-shifts and thumb shifters commonly used in gear-change mechanisms of conventional bicycles. It is envisaged that the brake input device may be similar to a conventional brake lever. However, in the present embodiment, it is envisaged that electrical versions of such selector switches and of the brake lever be used such that each is able to product an electrical signal indicative of its user-selected position. The crank speed and position sensor 260 is a conventional device that is arranged to sense the speed and angular position of the crank arms 50 and to output an electrical signal indicative of this. Each of the input means is connected and arranged to provide its respective electrical signal to the ECU 205.

A further output from the control means 200 is connected to an instrument panel 270.

The battery management unit 207 is connected to electrical energy storage means in the form of a rechargeable battery 208.

With reference again to FIG. 1, the ECU 205, the input controller 210, the output controller 220 and the battery management unit are housed within a control housing 90 fitted to the frame of the bicycle 10. The battery 208 is housed within a battery housing 92 that is also fitted to the frame.

Operation

Operation of the bicycle 10 will now be described. This description will take the form of a description of the steps of a method carried out by the ECU 205 in executing instructions contained in a computer program with which it is programmed.

Figure 4:
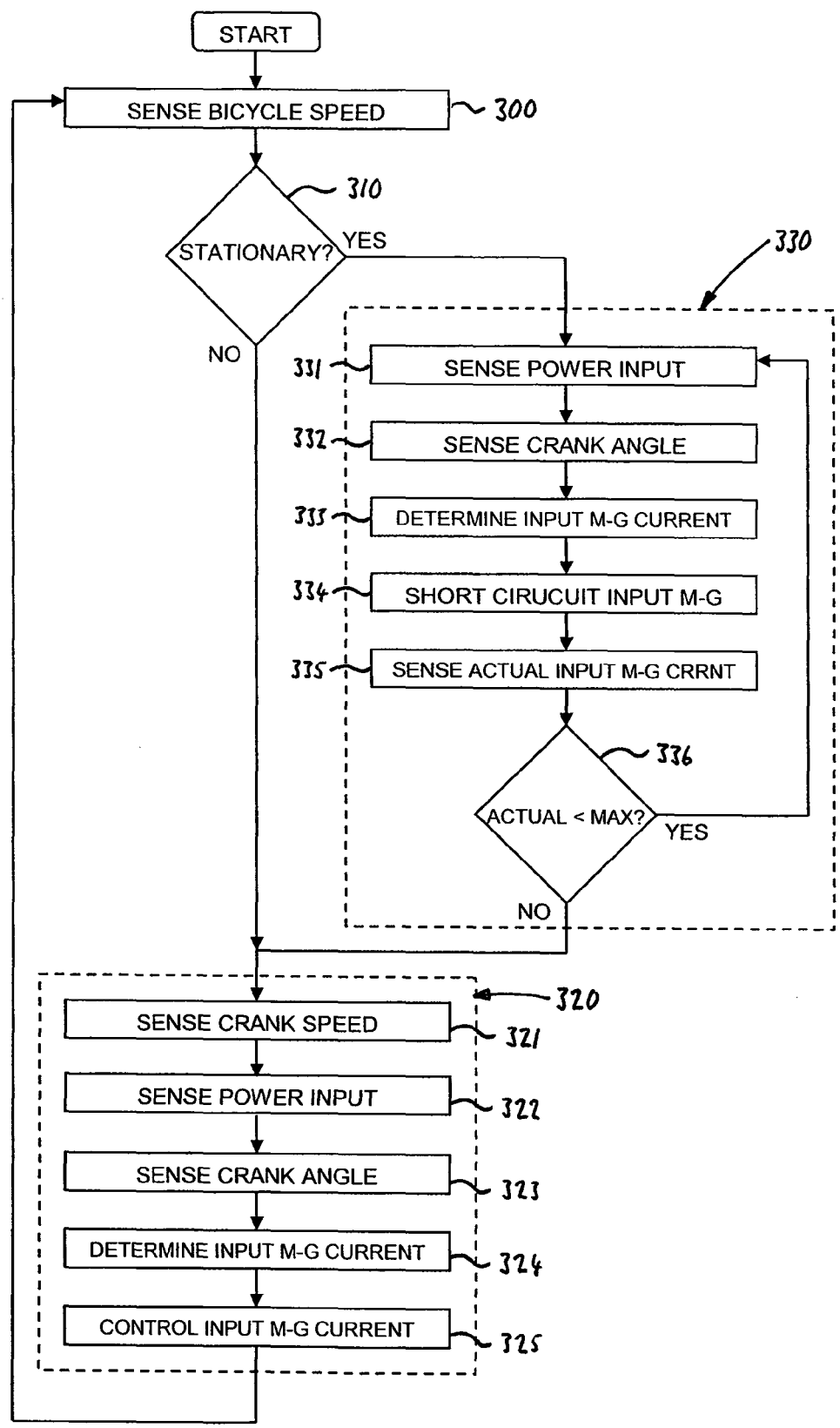
FIG. 4 is a flow diagram of steps of one embodiment of a method of operating the pedal cycle, the steps including steps of a "launch" routine and an "in-motion" routine.

With reference to FIG. 4, the method begins at step 300 in which the bicycle speed is sensed. This is done by the ECU 205 sensing the speed of the output motor-generator 110, the speed of the output motor-generator 110 being proportional to the speed of the bicycle 10. The ECU 205 senses the speed of the output motor-generator 110 by receiving a signal indicative of this from motor commutation sensors (although, in other embodiments, the voltage or the frequency of voltage peaks may instead by measured)

At step 310, the ECU 205 then determines from the speed sensed in step 310 whether or not the bicycle 10 is stationary. If it is not (i.e. if the bicycle 10 is moving) then the method executes an "in-motion" routine 320 that begins with step 321. If the bicycle is stationary, the method executes a "launch" routine 330 that begins with step 331. The launch routine 330 will be described below. Firstly however, the in-motion routine 320 is described.

In-Motion Routine

The in-motion routine 320 begins at step 321 in which the ECU 205 senses the output from the crank position and speed sensor 260 and determines from that the crank speed with which the cyclist is pedalling.

The in-motion routine 320 then proceeds to step 322. In this step, the ECU 205 senses the signal from the power input device, that signal being indicative generally of the power with which the cyclist wishes to pedal. As stated, the power input device is operable by the cyclist to select one from a plurality of settings, each corresponding generally to a respective power with which he or she wishes to pedal.

At step 323, the ECU 205 senses the output from the crank position and speed sensor 260 and determines from that the current position of the crank arms 50.

The method then proceeds to step 324 in which the ECU 205 determines a current that is to be drawn from the input motor-generator 120 operating as a generator. It should be understood that, by controlling the current in the input motor-generator 120 in this way, the torque on that machine, which is proportional to current, is also controlled. As the input motor-generator 120 is coupled to the crank arms 50 by the input epicyclic gear set 140, controlling the torque in the input motor-generator 120 also controls the torque in the crank arms 50 (the two torques are proportional), which is the torque that the cyclist applies to the crank arms 50 through the pedals 40. Thus, controlling the current in the input motor-generator 120 determines the force which the cyclist must apply to the pedals 40. In step 324, the ECU 205 controls the current drawn from the input motor-generator 120 so as to cause the pedals 40 to react against the cyclist with a force that gives rise to the cyclist pedalling with the power which the cyclist has indicated she or he wishes to pedal by the position of the power input device. In doing this, the ECU 205 makes use of the previously determined crank speed (determined in step 321) and the previously determined crank position (determined in step 323) to determine the current as a function of crank speed and crank position. This will now be explained in more detail.

Figure 4A:
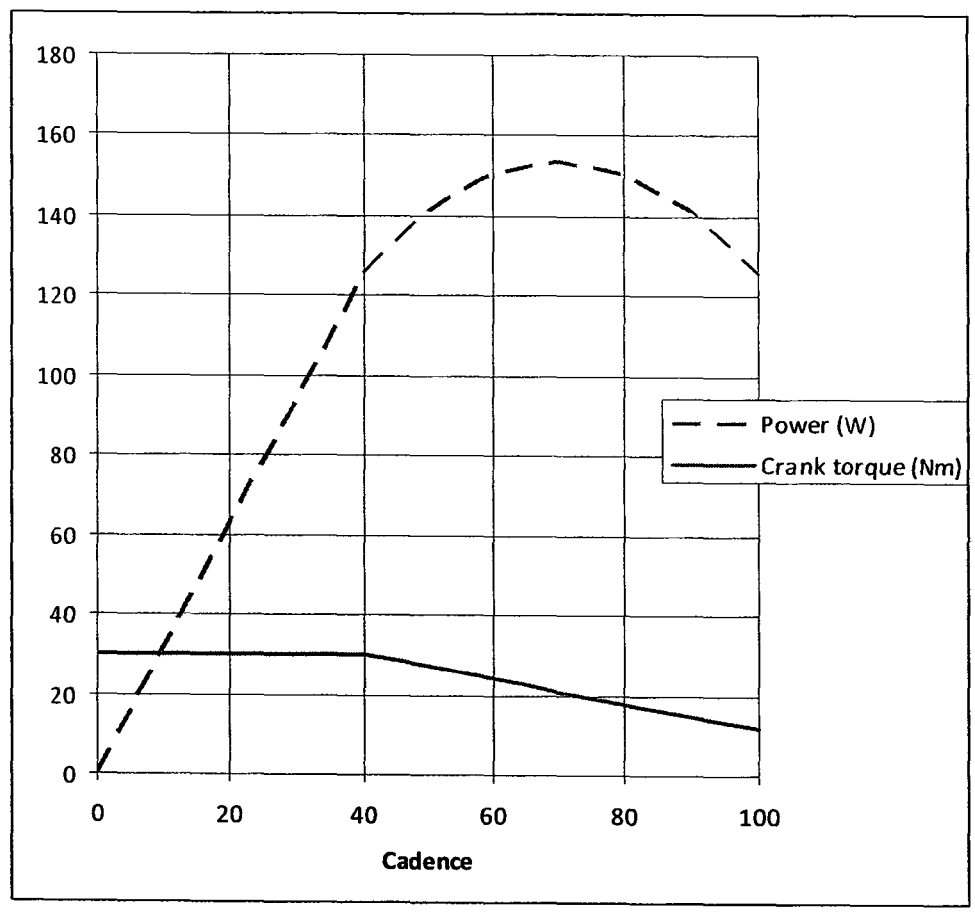
FIG. 4a is an example of a graph showing the variation with cadence of torque applied by a cyclist to crank arms of the pedal cycle.

Firstly, variation of the current as a function of crank speed is described. For each user-selectable setting of the power input device, the ECU 205 has access to a respective graph, or more precisely to information substantially indicative thereof in the form of a look-up table, that shows how the torque that a cyclist typically applies to crank arms 50 of a bicycle varies with crank speed (or "cadence" as it is sometimes called). An example of one such a graph is shown in FIG. 4a. As can be seen from FIG. 4a, the torque tends to reduce with increased cadence (and so it will be appreciated that such a graph also gives an indication of how the power output of the cyclist varies with cadence). Each of the graphs is generally of the same shape as each other, but the graphs are such that they would be spaced apart along the y-axis, that is along the torque axis, if shown on the same axes. Thus, each graph represents a cyclist cycling with different power across the cadence range. Having previously sensed the input provided by the power input device, the ECU 205 looks up the graph (or rather the look-up table) that corresponds to the user-selectable setting of the power input device indicated by that input. From this, the ECU 205 determines a torque with which the cyclist should pedal. As already mentioned, torque of the crank arms 50 is directly proportional to torque in the input motor-generator 120, which is directly proportional to current in that machine. The ECU 205 therefore applies a simple conversion factor to get a "notional" current that should be caused to exist in the input motor-generator 120 to give the torque retrieved from the look-up table that corresponds to the sensed crank speed for the user-selected power level.

Now, variation of the current as a function of crank position will be described. There is a natural variation in the force with which the cyclist presses on the pedals 40 over the crank cycle (for example, at top-dead-centre and bottom-dead-centre of the crank cycle the cyclist will exert almost no useful force on the pedals 40). The ECU 205 therefore modifies the "notional" to give an actual current to be drawn from the input motor-generator 120 that accounts for this natural variation. This actual current is constant for the same crank angle in successive crank cycles. Thus, this gives the same reaction force at the pedals 40 at the same crank angle in each cycle. The current is, however, varied over each crank angle sinusoidally with the crank angle. There are various ways in which this may be done. In the present embodiment, the ECU 205 applies an algorithm to the notional current to determine the actual current that varies with crank angle and that is to be drawn from the input motor-generator 120.

That completes step 324.

At step 325, the ECU 205 controls the input controller 220 such that the input motor-generator 120 is operated such that current determined in step 324 exists therein. At least at low bicycle speeds, this corresponds to operating the input motor-generator 120 as a generator. Step 325 concludes the in-motion routine 320.

Controlling the current in this way results in the bicycle 10 automatically changing the transmission ratio between the crank arms 50 and the rear wheel. For example, should the cyclist press on the pedals 40 with more force such that he or she applies torque that exceeds the torque corresponding to the current drawn from the input motor-generator 120 for the determined crank position, the motor-generator "gives way" and so accelerates. This changes the transmission ratio of the input epicyclic gear set 140 to change to a lower ratio. Thus, when the torque that the cyclist applies exceeds a certain limit, the arrangement automatically changes to a lower ratio. Thus, the arrangement automatically changes down in conditions when this is needed, such as when climbing a hill or accelerating rapidly.

Similarly, should the cyclist press the pedals 40 with less force and hence apply less torque than the torque that corresponds to the determined current that is to be drawn from the input motor-generator 120, the motor-generator 120 decelerates and resists motion of the crank arms 50 by the cyclist. This deceleration of the input motor-generator 120 again changes the transmission ratio of the second epicyclic gear set to a higher ratio. Thus, when the torque that the cyclist applies falls below a certain limit, the arrangement automatically changes to a higher ratio. Thus, the arrangement automatically changes up in conditions when this is needed, such as when going down hill or when easing off and approaching a steady speed from a period of acceleration.

By providing the cyclist with several user-selectable settings of the power input device, each one corresponding to a respective one of the graphs of torque against cadence, the cyclist can select generally the power with which he or she wishes to cycle. Additionally, he or she may change that power whilst cycling so that he or she can cycle generally harder or more easily.

After the in-motion routine 320, the method executes an assist routine 340, before returning to step 300. The assist routine 340 will be described further below with reference to FIG. 6. Firstly, however, the launch routine 330 mentioned above will be described.

Launch Routine

The launch routine 330 referred to above will now be described. Should the ECU 205 determine at step 310 that the bicycle 10 is stationary, the method executes the launch routine 330 and proceeds to step 331.

At step 331, the ECU 205 senses the signal from the power input device in the same way as in step 322 of the in-motion routine 320.

At step 332, the ECU 205 senses and determines the current crank angle in the same way as in step 323 of the in-motion routine 320.

At step 332, the ECU 205 determines the current that should be drawn from the input motor-generator 120, based on the signal from the power input device, the current crank angle and on the basis that the cadence is approximately zero (the graphs referred to hereinabove of torque against cadence include an indication of the torque applied by the cyclist at approximately zero cadence), in the same way as in step 324 of the in-motion routine 320.

The launch routine 330 then proceeds to step 334 in which the ECU 205 controls the input controller 210 to very nearly short-circuit the first motor-generator 110 (it generally being difficult to completely short-circuit the first motor-generator 110 because some current usually would usually need to flow between there and the input controller 210).

This effective short-circuit quickly builds up a reaction torque in the input motor-generator 120 against rotation thereof (this build up happens within about 5 to 10 degrees of crank angle). This reaction is transmitted through the input epicyclic gear set 140 to the crank arms 50 and pedals 40 and so gives the cyclist something to push against in setting off on the cycle. The effective short circuit tends to lock the input motor-generator 120 such that its rotor 122 does not rotate when the cyclist applies force to the pedals 40 and so transmits torque via the crank arms 50, the chain, the rear sprocket 80, the planetary carrier 142 and the planet gears 144 to the sun gear 146, which is coupled to the rotor 122. As a result, the torque applied by the cyclist is transmitted to the annulus 148, which is coupled to the hub 100. This causes the hub, and hence the wheel to which it is connected, to rotate; thereby driving the bicycle forwards from rest.

At step 335, the ECU 205 senses the actual current in the input motor-generator 120

Step 336 compares the sensed actual current against the current determined in step 333 and, for as long as the actual current is less than the determined current, causes the launch routine to return to step 331 and repeat. When the actual current reaches the determined current, step 336 causes the ECU 205 to exit the launch routine 330 and causes the in-motion routine 320 described hereinabove to start.

Alternative with Max Cadence Control

In a first alternative embodiment, the bicycle is the same as that 10 described hereinabove with reference to FIGS. 1 to 4, save for the following modifications.

Firstly, the user input means 250 are modified. Instead of having a user-operable power input device, the input means 250 has a user-operable torque input device and a user-operable maximum cadence input device (neither or which are shown) The torque input device is arranged to be operated by the cyclist to indicate, the torque that he or she wishes to transmit via the crank arms 50, that is, to indicate the force with which he or she wishes to pedal. The maximum cadence input device is arranged to be operated by the cyclist to indicate, in combination with the torque input device, the maximum power with which the cyclist wishes to pedal. Again, it is envisaged that the input devices may be user-operable selector switches that index between each of a plurality of different positions.

Operation of this embodiment is generally the same as that described above with reference to FIG. 4. However, the in-motion routine 320 described above with reference to FIG. 4 is replaced by a slightly modified in-motion routine 320'. This modified in-motion routine 320' will now be described with reference to FIG. 5.

In step 321', the ECU 205 senses and determines the crank speed as in previously described step 321.

Step 322' is new in this modified in-motion routine 320'. In this step, the ECU 205 senses the input provided by the torque input device. This replaces the step of sensing the input provided by the power input device.

In step 323', the ECU 205 senses and determines the crank angle as in previously described step 323.

Step 326 is new in this modified in-motion routine 320'. In this step, the ECU 205 senses the input provided by the maximum cadence input device.

In step 324', the ECU 205 determines the current to be caused to exist in the input motor-generator 120. This step is similar to that 324 previously described, but differs in that no graphs (or rather look-up tables) of torque against cadence are consulted. Instead, the ECU 205 determines the "notional" current based only on the input received from the torque input device, and then modifies this as previously described as a function of crank angle to give the actual current to be caused to exist in the input motor-generator 120 at each crank position. However, in step 324' the ECU 205 also compares the actual crank speed (i.e. the actual cadence) against the input received from the maximum cadence input device. If the actual cadence exceeds the cadence represented by the input received from the maximum cadence input device, the ECU 205 controls the input controller 210 to reduce the current in the input motor-generator 120 by a predetermined factor (or in other embodiments, by a predetermined amount). As will by now be understood, this reduces the torque in the input motor-generator 120 and the torque reaction transmitted to the cyclist, and so results in the cyclist to pedalling with lower power output. In other words, the modified arrangement described in this first alternative embodiment allows the cyclist to set a preferred cycling torque and a preferred maximum cycling power. It will be understood that this modified arrangement also changes ratio automatically as previously described.

In this alternative embodiment is envisaged that corresponding changes be made to step 333 of the launch routine 330 to account for the absence of the look-up tables of torque against cadence.

Electrical Assistance

In both the first embodiment described above with reference to FIGS. 1 to 4, and the first alternative embodiment described with reference to FIG. 5, the bicycle 10 is arranged to provide the cyclist with electrical assistance. This will now be described.

Firstly, the user input means 250 further includes a user-operable assist input device and a user-operable brake input device (not shown). The assist input device is arranged to be operated by the cyclist to indicate the factor by which the power that he or she provides to the drive arrangement by pedalling is supplemented with power from the battery. Again, it is envisaged that the assist input device is a user-operable selector that indexes between each of a plurality of different positions.

Figure 5:
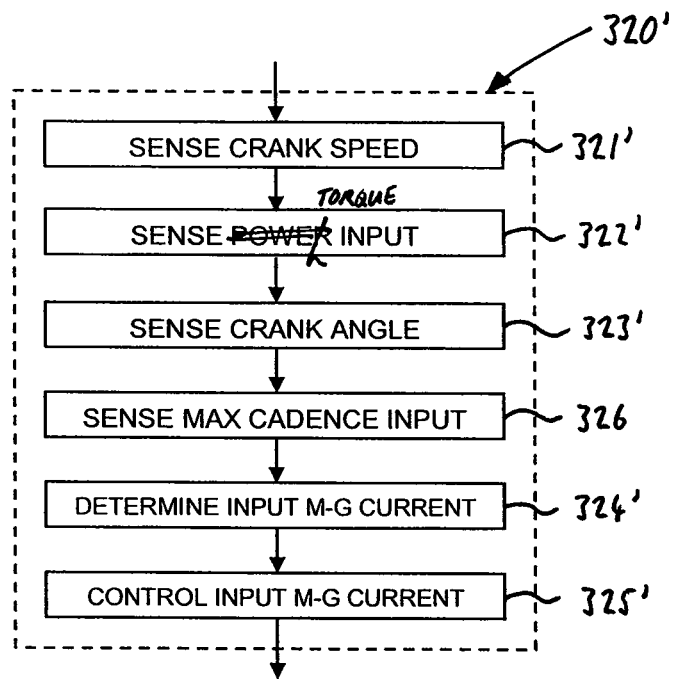
FIG. 5 is a flow diagram of steps of a modified in-motion routine of an alternative embodiment of the method.
Figure 6:
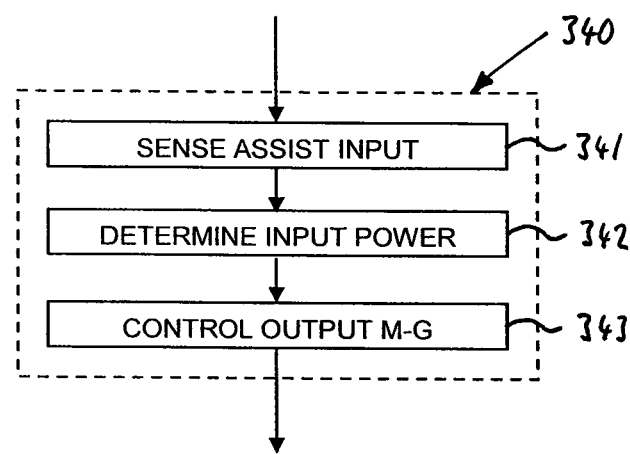
FIG. 6 is a flow diagram of steps of an assist routine that may form part of embodiments of the method.

The method of operation in the first embodiment, and in the first alternative embodiment, includes an "assist" mode omitted from FIG. 4 and FIG. 5 for clarity, but shown at 340 in FIG. 6. This assist mode 340 is included in the method after the in-motion mode 320 (or 320') and before the method returns back to step 300.

With continued reference to FIG. 6, the assist mode 340 begins at step 341 in which the ECU 205 senses the input provided from the assist input device. As mentioned hereinabove, this input indicates the factor by which the power that the cyclist provides to the drive arrangement by pedalling is to be supplemented with power from the battery 208. In this embodiment, this input can indicate each of three settings: that no electrical power is to be supplied from the battery 208 to supplement that provided by the cyclist (i.e. that no electrical assistance is to be provided), that power is to be supplied from the battery 208 to match that provided by the cyclist (e.g. 100% electrical assistance is to be provided), and that twice as much power is to be supplied from the battery 208 as is provided by the cyclist (e.g. 200% electrical assistance is to be provided). In other embodiments, the input may be indicative of each of several different absolute amounts of electrical power to be supplied from the battery 208.

At step 342, the ECU 205 then determines the power currently being supplied by the cyclist from a combination of the crank speed (sensed by sensing the input from the crank speed and position sensor 260) and the current determined in step 324 (or 324') and set in step 325 (this current, as mentioned above, is proportional to the torque in the input motor-generator 120 and hence the torque applied by the cyclist).

The method then proceeds to step 343 in which the ECU 205 controls the battery management unit 207 and the output controller 210 accordingly.

Specifically, if the input received from the assist input device indicates that no electrical assistance is to be provided, then the ECU 205 controls the battery management unit 207 such that no electrical power is supplied by the battery 208, and such that the output controller 210 operates the output motor-generator 110 as a motor powered solely by the electrical power generated by the input motor-generator 120. Thus, the rear wheel is driven mechanically and electro-mechanically purely from power supplied by the cyclist. The rear wheel is driven mechanically by the cyclist through the crank arms 50, rear sprocket 80, planetary carrier 142, planet gears 144 and annulus 148 of the input epicyclic gear set 140 to drive the hub 100; and electro-mechanically through the crank arms 50, rear sprocket 80, planetary carrier 142, planet gears 144 and sun gear 146 of the input epicyclic gear set 140 to drive the input motor-generator 120 as a generator and supply electrical power to the output motor generator 110 as a motor, which drives the hub 100 through the sun gear 136, planet gears 134 and annulus 138 of the output epicyclic gear set 130.

If, however, the input received from the assist input device indicates that electrical assistance should be provided, the ECU 205 controls the battery management unit 207 such that electrical power is supplied from the battery 208 to the output electrical machine 110 to supplement that generated by the input electrical machine 120 and supplied thereto. The ECU 205 operates to supply a level of electrical power determined by the input received from the assist input device and the power calculated at step 330 as being input by the cyclist. In this way, the factor of electrical power assistance selected by the cyclist is provided. In other respects, operation is the same as that just described for no electrical assistance.

Braking

Figure 7:
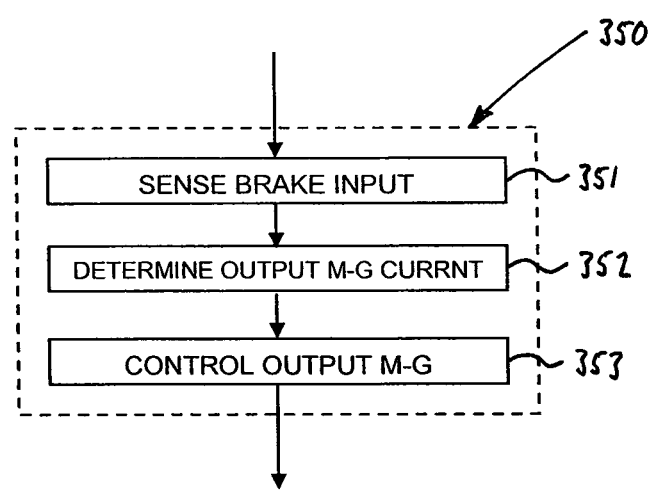
FIG. 7 is a flow diagram of steps of a braking routine of embodiments of the method.

In the embodiments described hereinabove, the bicycle has a brake input device that is variably operable by the cyclist to produce a signal indicative of a rate at which the cyclist wishes to brake the bicycle. The method of each of the described embodiments is such that the ECU 205 executes a breaking routine, shown at 350 in FIG. 7, when it receives an input from the brake input device indicative of the cyclist wishing to brake the bicycle. The braking routine 350 begins at step 351 with the ECU 205 sensing the input from the brake input device. At step 352, the ECU 205 determines an output current that when drawn from the output motor-generator 110 operating as a generator would exert a braking torque on the rear wheel 30 that would slow the bike at the rate of braking indicated by the input from the brake input device. At step 353, the ECU 205 controls the output controller 220 such that the output motor-generator 110 operates as a generator with the current determined in the previous step drawn therefrom.

In the embodiments described above, the ECU 205 operates the output controller 220 and the battery management unit 207 such that power generated by the output motor-generator 110 during braking is used to recharge the battery 208. In this way, regenerative braking is provided. Should the battery 208 be fully recharged, the arrangement operates to connect a resistor (not shown) across the output motor-generator 110 such that power generated thereby is dissipated as heat from the resistor. In alternative embodiments, the ECU 205 operates the output motor-generator 110 and/or the input motor-generator 120 inefficiently as generators, for example by shifting the phase of the current and/or voltage such that rotation of the or each generator is resisted, thereby braking the rear wheel 30. In such an arrangement, energy is dissipated in the windings and metal structure (sometimes referred to as the "iron") or the or each generator 110, 120.

In the embodiments described above, the bicycle includes a conventional brake on its front wheel.

Free-Wheel Routine

In order to allow the bicycle to free-wheel, the method include a "free-wheel" routine. This routine is not illustrated, but includes the steps of the ECU 205 sensing that the crank arms 50 are rotating at a cadence of less than 10 cycles per minute, and that the bicycle 10 is moving, and then, in response thereto, ceasing to cause a current to exist in the input motor-generator 120 and the output motor-generator 110 for as long as the crank arms 50 rotate at a cadence of less than 10 cycles per minute. In this way, the input motor-generator 120 can spin freely, such that no torque is transmitted back to the cyclist via the crank arms 50 or to the rear wheel 30 via the input epicyclic gear set 140. Similarly, the output motor generator 110 and hence the front wheel 20 also spin freely. Thus, the bicycle 10 can free-wheel.

Push Bike Alternative

In a second alternative embodiment, the bicycle 10 is modified to omit the battery 208 and the battery management unit 207. Thus, the modified bicycle (not shown, but similar in other respects to that 10 shown in FIG. 1) does not have an assist mode 340 and so transmits all power generated by the input motor-generator 120 operating as a generator to the output motor generator 110 to operate that machine as a motor to assist in driving the bicycle. Some electrical power may be used to power the control electronics, but, otherwise, substantially all generated power is used in driving the modified bicycle. In this way, a conventional bicycle (sometimes referred to as a "push bike") can be provided with automatically-changing ratios in a continuously variable transmission-type arrangement. It will be understood that, as the modified bicycles in this alternative embodiment omits the battery 208, there is also no regenerative braking to recharge such a battery in this embodiment.

Back Pedal Braking

In any of the embodiments described hereinabove, the bicycle 10 may be modified such that it additionally provides for back pedal braking. Those familiar with pedal cycle technology will understand that back pedal braking is provided on some bicycles by the inclusion of a specially adapted rear wheel hub in which components act to brake the hub when a backwards torque is exerted on the rear wheel sprocket by the cyclist attempting to pedal backwards with the cranks generally horizontal. The braking force applied to the hub is generally dependent on the backwards torque exerted on the rear wheel sprocket. The modification now described is to provide such functionality to embodiments of the present invention electro-mechanically.

The modification includes a "back pedal braking" routine (not shown) being included in any or all of the methods described hereinabove. The ECU 205 causes the method to enter this routine upon detecting backward motion of the crank arms 50 when those arms are between approximately 60 and 120 degrees from the vertical, that is, when very approximately horizontal. Upon entering the routine, the ECU 205 causes the input motor-generator 120 to be operated as a generator by drawing a current therefrom, such that the input motor-generator 120 is driven via the input epicyclic gear set 140 by rotation of the rear wheel 30, such that rotation of the rear wheel 30 is thereby resisted by the input motor-generator 120. Thus, a braking torque is applied to the rear wheel 30. Operating the input motor-generator 120 as a generator in this way to apply a braking torque to the rear wheel 30 also causes a torque to be transmitted back, via the crank arms 50, to the cyclist to oppose the backward pedalling. This reaction against the cyclist gives feedback that the bicycle 10 is being braked.

The back pedal braking routine further includes the ECU 205 increasing the current drawn from the input motor-generator 120 in response to sensing further backward movement of the crank arms 50. It is envisaged that the current drawn, and hence the braking torque applied, increase to a maximum over approximately 10 degrees of crank arm movement. The maximum braking torque applied is limited approximately to that at which the rear wheel 30 tends to lock and skid.

In a further modification, it is envisaged that the back pedal braking routine includes the ECU 205 operating the output motor-generator 110 as a generator in the same way as it operates the input motor-generator 120 as a generator in this routine, thereby applying a braking torque to the front wheel 20. In such a further modification, the brake input device referred to above would be omitted.

As with the regenerative braking described hereinabove, power generated by the input motor-generator 120 (and by the output motor-generator 110) when operated in this way in response to back-pedalling can be used to recharge the battery 208.

Sporty Back Pedal Braking

In any of the embodiments described above, the bicycle may include an alternative to the form of back pedal braking just described. In this alternative, the ECU 205 causes the method to enter a "sporty back pedal braking" routing upon detecting that the crank arms 50 are moving backwards. In this routine, the ECU 205 causes the input motor-generator 120 to operate as a generator with a predetermined current drawn therefrom. As already described, this tends to brake the rear wheel 30. By pedalling backwards, the cyclist provides torque that helps to turn the input motor-generator 120 as a generator and that also helps to brake the rear wheel 30. Thus, the bicycle is braked and electrical power is generated that can be used to recharge the battery 208. It will be appreciated that the current drawn from the input motor-generator 120 in this routine is of opposite direction from that caused to exist in the in-motion routine described hereinabove with reference to FIG. 4.

Anti-Lock Braking

In any of the embodiments described above, the bicycle may be further modified to include an anti-lock braking system (ABS). In such a modification, the ECU 205 senses the speed of the input motor generator 120 and/or the speed of the output motor-generator 110 by conventional means. In response to determining deceleration of one or both of the motor-generators 110, 120 above a predetermined rate, or sudden stopping of one or both motor-generator 110, 120, the ECU 205 operates to reduce the current drawn from the or each motor-generator that is decelerating too rapidly or, as the case may be, that stops suddenly. The method may include the ECU 205 increasing the relevant current again once it has determined that the or each motor-generator 110, 120 is no longer decelerating above the predetermined rate or, as the case may be, is no longer stopped.

Traction Control

It is similarly envisaged that in one or more embodiments, the ECU 205 may operated to control the current the input motor-generator and/or the output motor-generator to provide traction control to the front and/or rear wheel.

Node Point

Reference is made hereinabove to a "node point". At lower speeds, the input motor-generator 120 is operated as a generator, with the current determined in step 324 (or 324') drawn therefrom. Accordingly, the output motor-generator 110 is operated as a motor and powered at least partly by the input motor-generator 120. As the cyclist pedals faster and causes the bicycle to accelerate and the arrangement to, as described, automatically change the transmission ratio, the input motor-generator 120 slows down, even though (or rather because) the current drawn therefrom remains the same. As the cyclist continues to accelerate the bicycle, at one point of operation the input motor-generator 120 stops and then begins to turn in the other direction, with the current therein still maintained constant. With the input motor-generator now rotating in the opposite direction, but with the current therein still controlled to be the same, the input motor-generator 120 is now operating as a motor. Accordingly as the input motor-generator 120 is connected to the output motor-generator 110, that output machine 120 is now operating as a generator. The point at which the input motor-generator 120 changes direction is the "node point". This is a natural phenomenon of the embodiments described above and happens automatically as a result of the ECU 205 controlling the first controller 210 to maintain a constant current in the input electrical machine 110. It allows the arrangement to provide a broader range of transmission ratios, that is of different "gears" automatically selectable by the arrangement. In the method of operation described hereinabove with reference to FIGS. 4 to 7, the input motor-generator 120 is mainly described as operating as a generator (as is the case when the cyclist is operating the bicycle at speeds below the node point) for simplicity of explanation. However, it will now be understood, that the method of current control described hereinabove results in the input motor-generator 120 operating as a motor and the output motor-generator 110 operating as a generator above the node point.

Alternative Packaging

The control means 200 described hereinabove with reference to FIG. 3, and the methods of operation described hereinabove with reference to FIGS. 4 to 7, may be used to operate similar, but differently configured, electro-mechanical arrangements in other pedal cycles.

Figure 8:
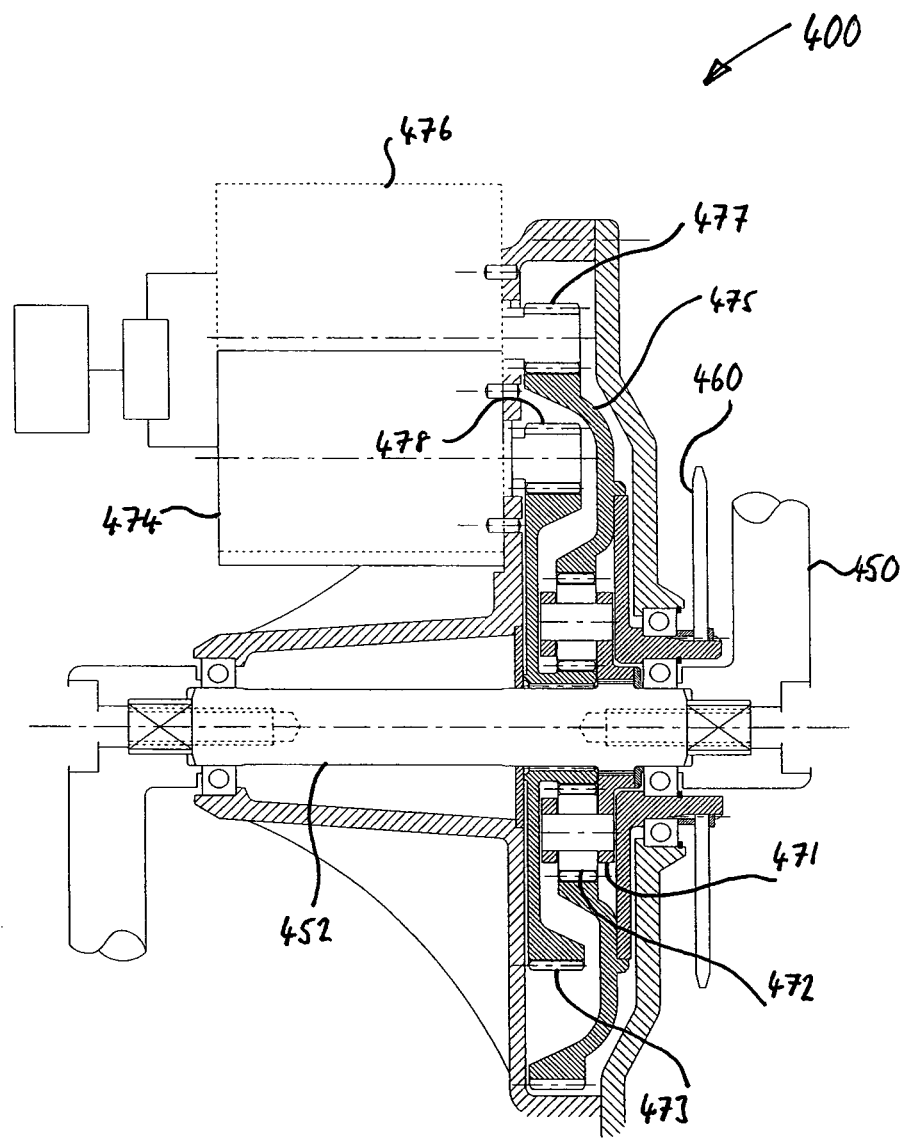
FIG. 8 is a combined sectional and schematic view of a crank case of an alternative pedal cycle in which the invention is embodied, the section being taken radially.

For example, the control means and method may be used to control a first alternative arrangement such as that 400 shown in FIG. 8. In this first alternative arrangement, an input motor-generator 474 and an output motor-generator 476 are provided, together with an epicyclic gear set, in the crank case of a bicycle. Two crank arms 450 are joined to each other by a crank axle 452. The crank axle 452 is coupled to and rotates a planetary carrier 471 with planet gears 472 thereon. The planet gears 472 mesh with a radially-inner set of teeth on a sun gear 473, a radially-outer set of teeth on that same sun gear 473 meshing with a pinion gear 478 coupled to the rotor of the input motor-generator 474. The planet gears 472 also mesh with a radially-inner set of teeth on an annulus gear 475, a radially-outer set of teeth on the annuls gear 475 meshing with another pinion gear 477 coupled to the rotor of the output motor-generator 476. The annulus gear 475 is coupled to drive the usual large toothed cog 460 that is concentric with the crank axle 452, but which in this arrangement is not coupled to the crank arms 450. The toothed cog 460 receives a chain (not shown) for driving a sprocket mounted on the rear wheel in the conventional way. In other words, the electro-mechanical configuration of this first alternative arrangement is like that shown in and described in and with reference to the drawing of European Patent Application No. 09251183.1, it being envisaged that the present method may be used to control such an arrangement.

Figure 9:
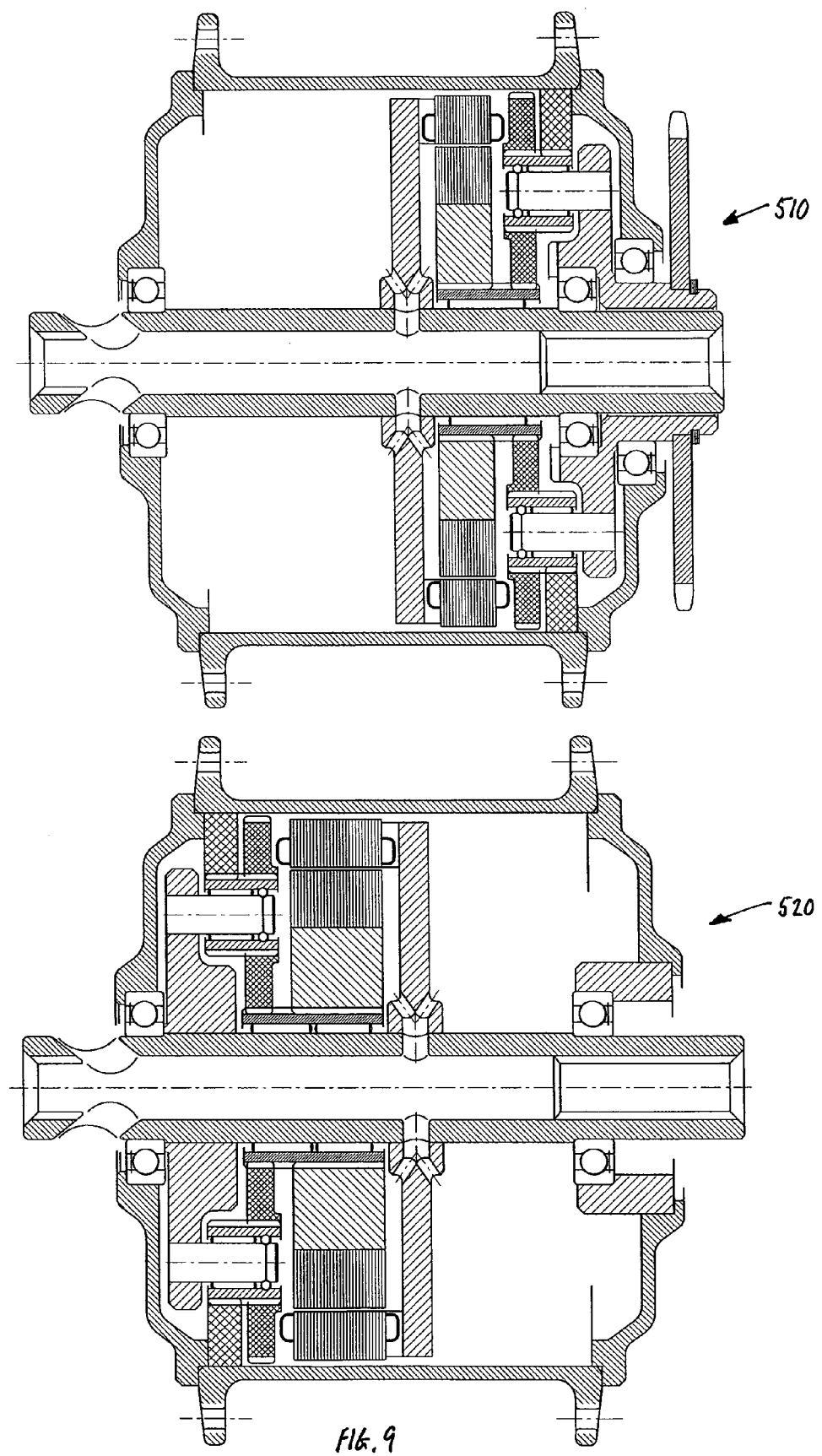
FIG. 9 is a section view of a front hub and a rear hub of another alternative pedal cycle in which the invention is embodied, the sections again being radial.

Alternatively, the control means and method may be used to control a second alternative arrangement such as that 500 shown in FIG. 9. This is similar to the first arrangement described hereinabove with reference to FIG. 2, but differs in that the input motor-generator 120 and input epicyclic gear set 140 only are maintained in the hub 100 of the rear wheel 30, with the output motor-generator 110 and output epicyclic gear set 130 being mounted in the hub of the front wheel 20. Other than that, the arrangement 500 is substantially the same as that previously described.

Figure 10:
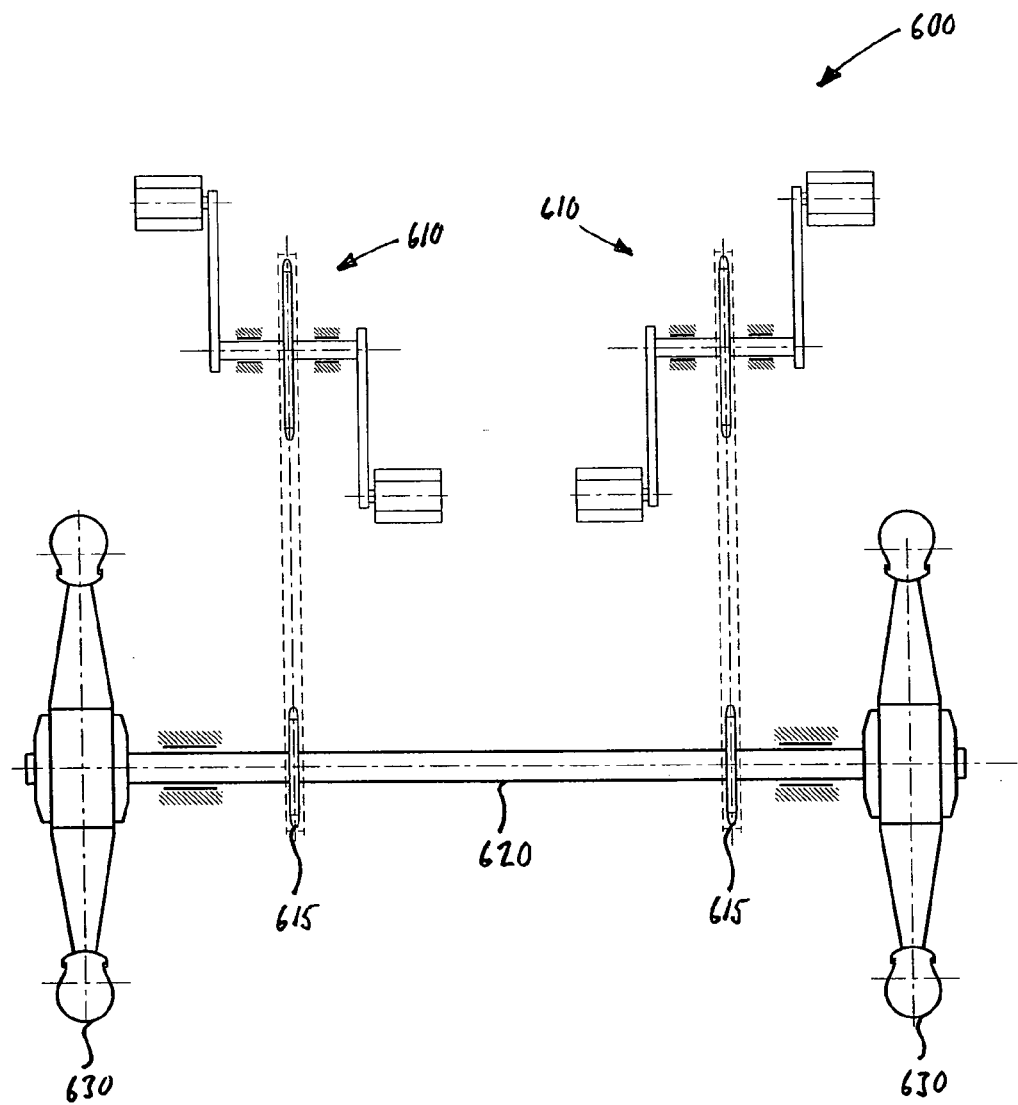
FIG. 10 is a schematic view of the layout of certain components of a four-wheeled pedal cycle in which the invention is embodied.

FIG. 10 shows another arrangement 600 in which control is provided in substantially the same way for a four-wheeled pedal cycle having two pairs of crank arms 610 with pedals thereon, each pair of crank arms coupled to a respective large toothed cog in the conventional manner. Each rear wheel includes one of the hub-mounted arrangements described hereinabove with reference to FIG. 2. A driveshaft is provided between the two arrangements to couple together the planetary carriers 142 of the two input epicyclic gear sets 140. Two sprockets are provided on and coupled to the driveshaft, each to receive and be driven by a respective chain coupled to a respective one of the large toothed cogs. Providing a hub-mounted arrangement such as this in each rear wheel removes the need for a differential, the inclusion of which in four-wheeled pedal cycles, especially those that are electrically assisted, has proved problematic.

Use as Exercise Cycle

It is envisaged that any of the embodiments described above may be arranged for use as a stationary exercise pedal cycle. For such use, the pedal cycle would be supported with its rear wheel or wheels fixed and pedalled by a cyclist to rotate the or each input motor-generator. It is envisaged that such a pedal cycle would include a user-operable control to determine the current drawn from the or each input motor-generator and hence the resistance against which the cyclist pedals. It is envisaged that electrical power generated by the cyclist in using the pedal cycle in this way be used to recharge the battery.

The invention claimed is:

1. A method of operating a pedal cycle, the pedal cycle having an electro-mechanical drive arrangement including an input electrical machine, an output electrical machine and an input epicyclic gear set; wherein, of the input epicyclic gear set, a first component is coupled to be driven by crank arms of the cycle, a second component is coupled to one of the rotor and stator of the input electrical machine, the other of the rotor and stator being fixed relative to the cycle, and the third component is coupled to drive a wheel of the cycle; the output electrical machine being arranged to at least assist in driving the or another wheel of the cycle when operated as a motor; the method including the steps of:
   a) operating the input electrical machine as a generator to at least partly power the output electrical machine as a motor;
   b) determining the angular position of the crank arms;
   c) controlling the current in the input electrical machine so as not to exceed a maximum current nor fall below a minimum current for the determined angular position of the crank arms.

2. A method of operating a pedal cycle, the pedal cycle having an electro-mechanical drive arrangement including an input electrical machine, an output electrical machine and an input epicyclic gear set; wherein, of the input epicyclic gear set, a first component is coupled to be driven by crank arms of the cycle, a second component is coupled to one of the rotor and stator of the input electrical machine, the other of the rotor and stator being fixed relative to the cycle, and the third component is coupled to drive a wheel of the cycle; the output electrical machine being arranged to be driven by the or by another wheel of the cycle and to be operated as a generator; the method including the steps of:
   a) operating the output electrical machine as a generator to at least partly power the input electrical machine as a motor to at least assist in driving the wheel coupled to the third component;
   b) determining the angular position of the crank arms;
   c) controlling the current in the input electrical machine so as not to exceed a maximum current nor fall below a minimum current for the determined angular position of the crank arms.

3. A method according to claim 1, wherein the arrangement includes an output epicyclic gear set, a first component thereof being fixed relative to the cycle, a second component thereof being coupled to the rotor of the output electrical machine, the stator being fixed relative to the cycle, and the third component thereof being coupled to drive the, or the other, wheel of the cycle.

4. A method according to claim 1, wherein the maximum current and the minimum current are the same.

5. A method according to claim 1, wherein there are a plurality of maximum and minimum currents for the determined angular position of the crank arms, and wherein step (c) includes the step of determining a maximum and minimum current from the plurality thereof and then controlling the current in the input electrical machine so as not to exceed this determined maximum current and/or not fall below this determined minimum current for the determined angular position of the crank arms.

6. A method according to claim 5, wherein the determining includes receiving an input from a user indicative of a selected maximum and/or minimum current and using this to set the determined maximum current and/or minimum current.

7. A method according to claim 6, wherein the determining further includes determining the cadence of the crank arms and using this to set the determined maximum current and or minimum current.

8. A method according to claim 7 and including the step of consulting a record indicative of how torque output of a cyclist varies with cadence, and from this obtaining and indication of a torque that corresponds to the determined cadence, and hence of an appropriate maximum and minimum current.

9. A method according to claim 1, wherein the maximum and minimum currents are different at different angular positions of the crank arms, thereby at least partly taking account of the natural variation in torque applied by the cyclist to the crank arms over one cycle, the method including the step of varying the maximum and minimum currents with angular position of the crank arms accordingly.

10. A method according to claim 1 and including supplying substantially all electrical energy generated by one of the input and output electrical machine to the other of the input and output electrical machine to operate that other electrical machine as a motor.

11. A method according to claim 1 and including receiving an assist input from a user indicating that stored electrical energy should be supplied to the output electrical machine to supplement electrical energy supplied thereto and generated by the input electrical machine; and including supplying stored electrical energy accordingly in response to receipt of the assist input.

12. A method according to claim 11 and including supplying stored electrical energy to the output electrical machine regardless of whether or not electrical energy is being generated by the input electrical machine.

13. A method according to claim 1, wherein the method includes the step of controllably supplying electrical power to the output electrical machine such that that power varies over a cycle of the crank arms so as to at least reduce the tendency for variation in power output to the or each driven wheel over a cycle of the crank arms that results from a variation in power input by the cyclist over that cycle.

14. A method according to claim 13, wherein the method includes the step of powering the output electrical machine by discharging the store of electrical energy over successive cycles of the crank arms; and/or by storing temporarily electrical energy generated in one part of the cycle of the crank arms, and using this to power the output electrical machine in another part of the cycle.

15. A method according to claim 1, wherein the method includes the step of determining that the bicycle and/or the crank arms are substantially stationary and, in response thereto, substantially short-circuiting the input electrical machine.

16. A method according to claim 15, wherein the method includes the step of maintaining the substantial short-circuiting of the input electrical machine until the actual current in the input electrical machine reaches the maximum current.

17. A method according to claim 1, wherein the method includes the step of operating one or both of the electrical machines as a generator to retard the pedal cycle.

18. A pedal cycle arranged to carry out a method according to claim 1; or an electronic control unit programmed and operable to carry out a method according to claim 1; or a computer program having code portions executable by the electronic control unit that carries out a method according to claim 1; a record carrier having thereon or therein a record of a computer-readable instructions executable to cause the electronic control unit to carry out a method according to claim 1.

19. The method according to claim 17, wherein the step of operating one or both of the electrical machines as a generator to retard the pedal cycle includes operating one or both of the electrical machine inefficiently.

20. A method according to claim 19, wherein one or both of the electrical machines are operated inefficiently by shifting the phase of the current and/or voltage thereof to dissipate generated electrical energy as heat and thereby retard the pedal cycle.

* * * * *